(12) United States Patent
Zhang

(10) Patent No.: US 10,704,754 B2
(45) Date of Patent: Jul. 7, 2020

(54) VEHICLE LAMP SYSTEM BASED ON PBS (POLARIZATION BEAM SPLITTER)

(71) Applicant: HASCO VISION TECHNOLOGY CO., LTD., Shanghai (CN)

(72) Inventor: Jie Zhang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/346,066

(22) PCT Filed: May 22, 2017

(86) PCT No.: PCT/CN2017/085301
§ 371 (c)(1),
(2) Date: Apr. 29, 2019

(87) PCT Pub. No.: WO2018/209715
PCT Pub. Date: Nov. 22, 2018

(65) Prior Publication Data
US 2020/0056755 A1 Feb. 20, 2020

(30) Foreign Application Priority Data
May 14, 2017 (CN) .......................... 2017 1 0336927

(51) Int. Cl.
*F21S 41/135* (2018.01)
*F21S 41/64* (2018.01)
*G02B 27/28* (2006.01)

(52) U.S. Cl.
CPC .......... *F21S 41/135* (2018.01); *F21S 41/645* (2018.01); *G02B 27/283* (2013.01)

(58) Field of Classification Search
None
See application file for complete search history.

(56) References Cited

U.S. PATENT DOCUMENTS

| | | | |
|---|---|---|---|
| 2008/0030974 A1* | 2/2008 | Abu-Ageel | F21V 5/008 362/19 |
| 2016/0169469 A1* | 6/2016 | Sugiyama | F21S 41/135 362/19 |
| 2016/0295178 A1* | 10/2016 | Damberg | H04N 9/3129 |
| 2017/0339378 A1* | 11/2017 | Okumura | G02B 5/003 |

* cited by examiner

*Primary Examiner* — Ashok Patel

(57) ABSTRACT

A vehicle lamp system based on a PBS (Polarization Beam Splitter) is provided, including a light source, the PBS, a collimating lens set, an imaging lens set, an LCOS (Liquid Crystal on Silicon) control chip and a light path control unit. The collimating lens set and the PBS are successively arranged along a light emission direction of the light source. The LCOS control chip is arranged at a light path of an S wave reflected by a contact surface of the PBS. The imaging lens set is arranged at an emergent light path of the S wave after being modulated by the LCOS control chip and transmitted through the contact surface of the PBS. The light path control unit is arranged at a light path of a P wave transmitted through the contact surface of the PBS. Through the light path control unit, utilization of a light energy is improved.

5 Claims, 3 Drawing Sheets

VEHICLE LAMP SYSTEM BASED ON PBS (POLARIZATION BEAM SPLITTER)

CROSS REFERENCE OF RELATED APPLICATION

This is a U.S. National Stage under 35 U.S.C 371 of the International Application PCT/CN2017/085301, filed May 22, 2017, which claims priority under 35 U.S.C. 119(a-d) to CN 201710336927.6, filed May 14, 2017.

BACKGROUND OF THE PRESENT INVENTION

Field of Invention

The present invention relates to a field of vehicle lamp, and more particularly to a vehicle lamp system based on a PBS (Polarization Beam Splitter).

Description of Related Arts

FIG. 1 is a schematic diagram of a conventional LCOS (Liquid Crystal on Silicon) projection system. Beams emitted from the light source 1 are collimated by the collimating lens set 2 to approximate parallel beams, and then are transmitted to the PBS (Polarization Beam Splitter) 3. At a contact surface of the PBS 3, because the S wave cannot pass through the contact surface, the S wave is reflected out of the PBS 3. The LCOS control chip 4 is arranged at an emergent plane of the S wave. Through modulation of the LCOS control chip 4, control of the image is realized. Because the vibration direction of the S wave after modulating changes, the S wave can be directly transmitted through the contact surface of the PBS, and then is projected onto the screen through the imaging lens set 5. The P wave, which is directly transmitted through the PBS 3, cannot be utilized, and is generally absorbed with the black material for avoiding affecting the imaging quality, resulting in the loss of the light energy.

SUMMARY OF THE PRESENT INVENTION

Aiming at the above problems, the present invention provides a vehicle lamp system based on a PBS (Polarization Beam Splitter), so as to greatly improve utilization of a light energy of a light source.

The present invention is realized through technical solutions as follows.

A vehicle lamp system based on a PBS comprises a light source, the PBS, a collimating lens set, an imaging lens set, an LCOS (Liquid Crystal on Silicon) control chip and a light path control unit, wherein: the collimating lens set and the PBS are successively arranged along a light emission direction of the light source; the LCOS control chip is arranged at a light path of an S wave reflected by a contact surface of the PBS; the imaging lens set is arranged at an emergent light path of the S wave after being modulated by the LCOS control chip and transmitted through the contact surface of the PBS; and the light path control unit is arranged at a light path of a P wave transmitted through the contact surface of the PBS.

Through modulation of the LCOS control chip to the S wave, a light path which can be dynamically turned on and off is formed for an intelligent high beam illumination function. (The Chinese patent application of CN 201210325980.3 provides a solution of mechanical intelligent high beam illumination, while the present invention realizes the electronically controlled intelligent high beam illumination through the LCOS control chip.)

Preferably, the light path control unit is a lens or a mirror.

Preferably, the light path control unit is vehicle lamp components, comprising a mirror, a light shield and a magnifying glass.

Preferably, the collimating lens set consists of a negative meniscus lens and a plane convex lens, which are arranged coaxially, wherein the negative meniscus lens is close to the light source, and the plane convex lens is close to the PBS.

Preferably, the imaging lens set consists of a concave lens and a plane convex lens, which are arranged coaxially, wherein the concave lens is close to the PBS, and the plane convex lens is far away from the PBS.

Preferably, the contact surface of the PBS and an incident light after being collimated by the collimating lens set form an angle of 45°.

Preferably, when liquid crystal of the LCOS control chip is bright, the LCOS control chip changes the S wave reflected by the contact surface of the PBS to the P wave, so as to be transmitted through the contact surface of the PBS and enter the imaging lens set.

The present invention has the beneficial effects that: through adding the light path control unit, the P wave transmitted through the contact surface of the PBS is used as low beam illumination or a part of low beam illumination, so that utilization of the light energy of the light source is improved.

In figures: 1: light source; 2: collimating lens set; 3: PBS (Polarization Beam Splitter); 4: LCOS control chip; 5: imaging lens set; 6: light path control unit; 7: mirror; 8: light shield; 9: magnifying glass; 11: S wave; and 12: P wave.

DETAILED DESCRIPTION OF THE PREFERRED EMBODIMENT

The present invention is further illustrated with the preferred embodiment and the accompanying drawings as follows.

Figure 1:
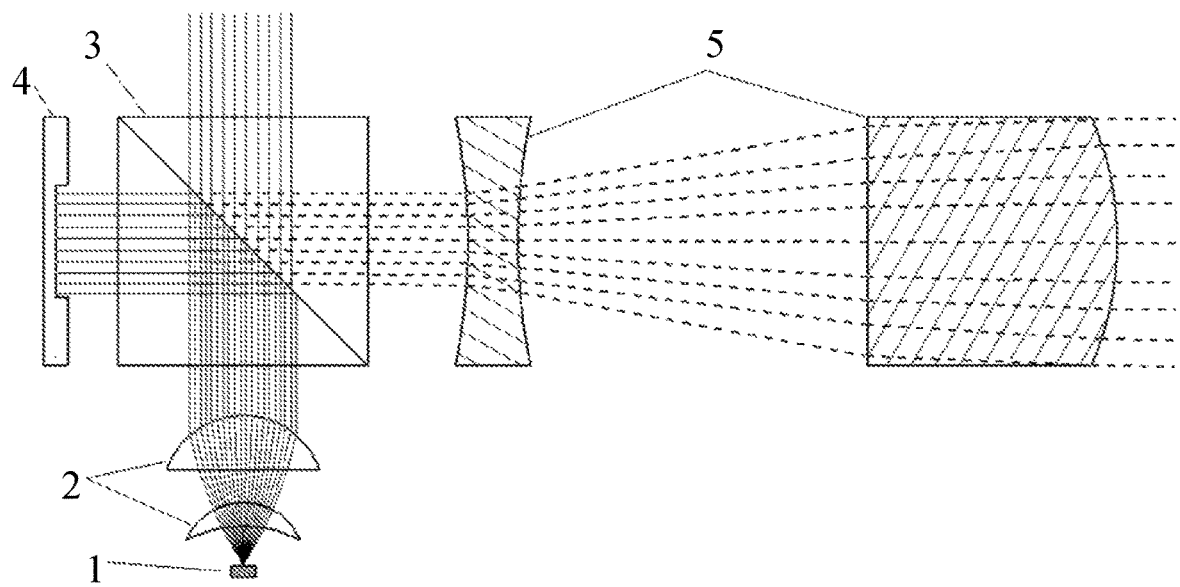
FIG. 1 is a schematic diagram of a conventional LCOS (Liquid Crystal on Silicon) projection system in prior art.
Figure 2:
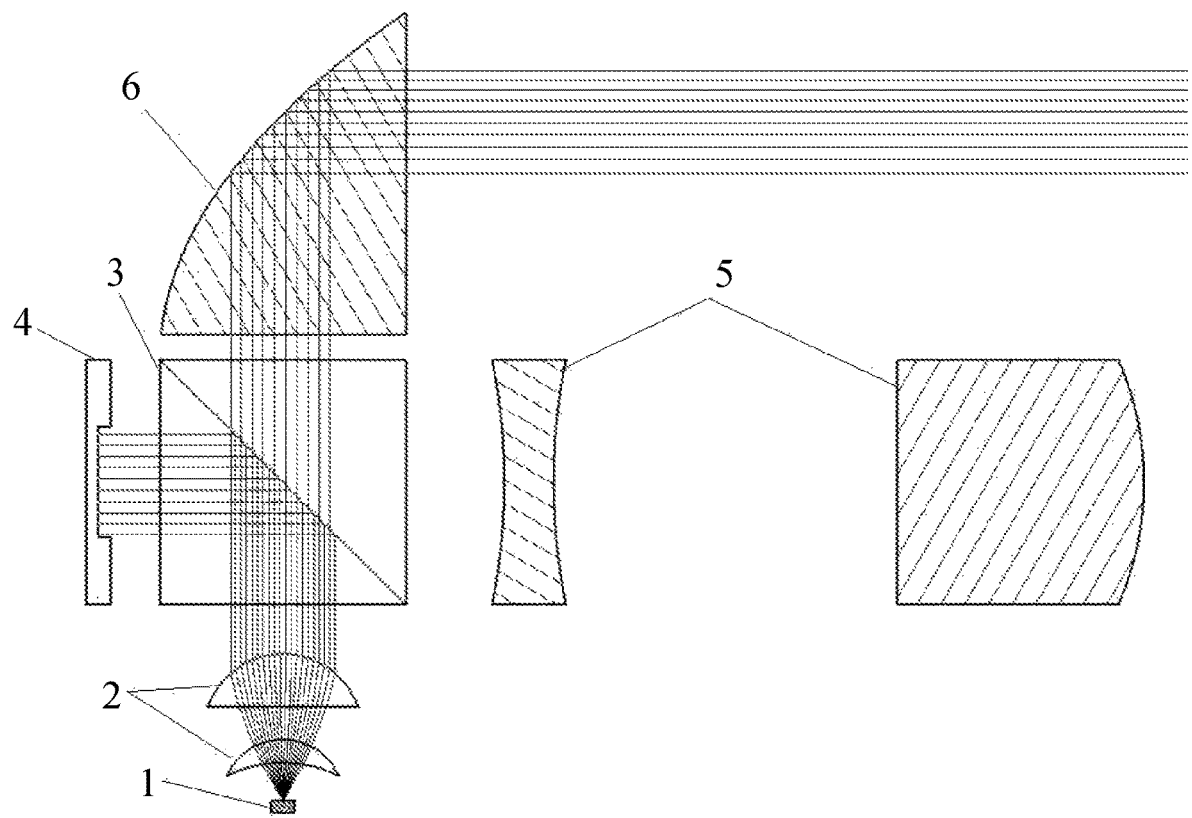
FIG. 2 is a schematic diagram of low beam illumination according to the present invention.
Figure 3:
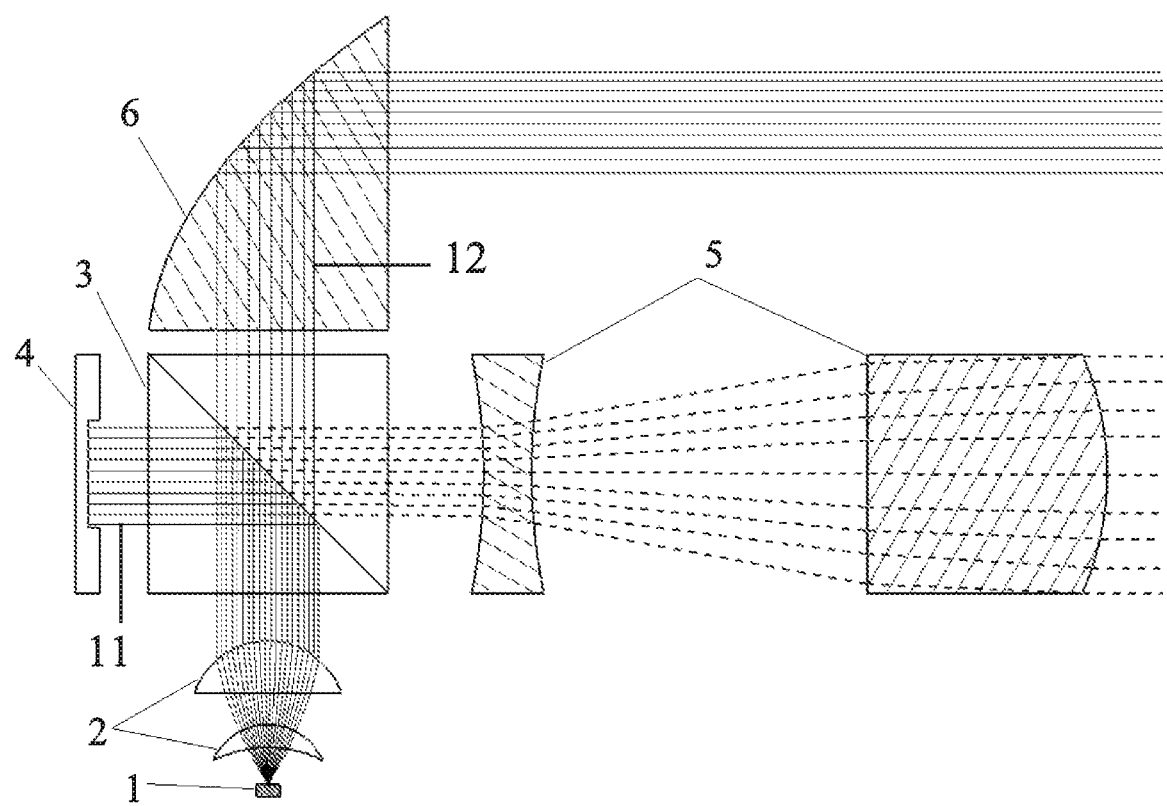
FIG. 3 is a schematic diagram of both low beam illumination and high beam illumination according to the present invention.

As shown in FIG. 2 and FIG. 3, a vehicle lamp system based on a PBS (Polarization Beam Splitter), which is improved on a conventional LCOS (Liquid Crystal on Silicon) projection system, comprises a light source 1, the PBS 3, a collimating lens set 2, an imaging lens set 5, an LCOS control chip 4 and a light path control unit 6.

The collimating lens set 2 and the PBS 3 are successively arranged along a light emission direction of the light source 1. A contact surface of the PBS 3 and an incident light after being collimated by the collimating lens set 2 form an angle of 45°. The collimating lens set 2 consists of a negative meniscus lens and a plane convex lens, which are arranged coaxially, wherein the negative meniscus lens is close to the light source 1, and the plane convex lens is close to the PBS 3. The collimating lens set 2 is used for collimating beams emitted from the light source 1 to approximate parallel beams.

The LCOS control chip 4 is arranged at a light path of an S wave 11 reflected by the contact surface of the PBS 3. When liquid crystal of the LCOS control chip 4 is bright, the LCOS control chip changes the S wave reflected by the contact surface of the PBS 3 to a P wave, so as to be transmitted through the contact surface of the PBS 3 and enter the imaging lens set 5. That is to say, the LCOS control chip 4 is used for modulating a vibration direction of the S wave, so that the vibration direction of the S wave is rotated by 90° and the S wave is transmitted through the contact surface of the PBS, for an intelligent high beam illumination function.

The imaging lens set 5 is arranged at an emergent light path of the S wave 11 after being modulated by the LCOS control chip 4 and transmitted through the contact surface of the PBS 3. After passing through the imaging lens set 5, the S wave is projected onto a screen, so as to realize high beam illumination. The imaging lens set 5 consists of a concave lens and a plane convex lens, which are arranged coaxially, wherein the concave lens is close to the PBS 3, and the plane convex lens is far away from the PBS 3.

Figure 4:
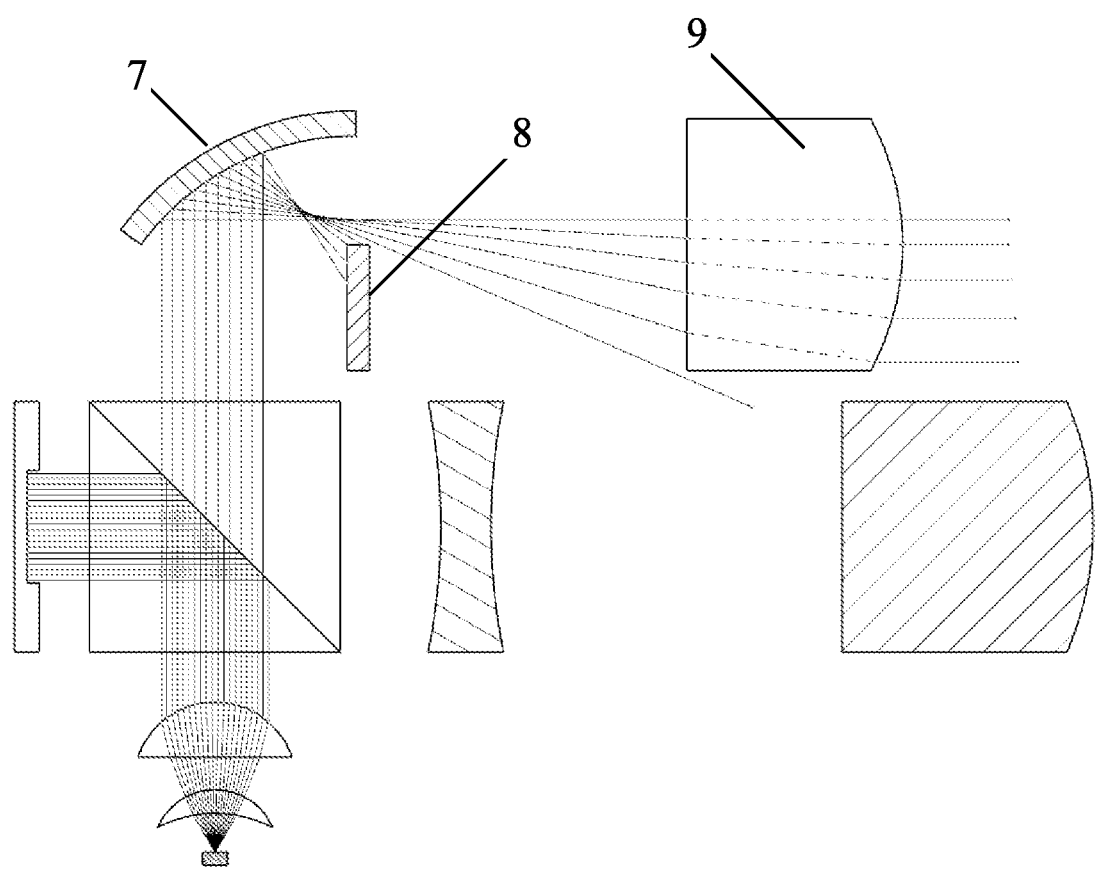
FIG. 4 is a schematic diagram of a light path control unit according to the present invention.

The light path control unit 6 is arranged at a light path of a P wave 12 transmitted through the contact surface of the PBS 3. Particularly, the light path control unit 6 is a lens, a mirror, or vehicle lamp components comprising a mirror, a light shield and a magnifying glass, for applying the uncontrollable P wave as low beam illumination or a part of low beam illumination which is always bright, so that utilization of the light energy of the light source is greatly improved. In the preferred embodiment of the present invention, as shown in FIG. 4, the light path control unit 6 is the vehicle lamp components, comprising the mirror 7, the light shield 8 and the magnifying glass 9.

It should be noted that: the specific shape and production process illustrated in the preferred embodiment is only one detailed and effective example of the present invention, not for limiting the technical scope of the present invention.

What is claimed is:

1. A vehicle lamp system based on a PBS (Polarization Beam Splitter), comprising a light source (1), the PBS (3), a collimating lens set (2), an imaging lens set (5), an LCOS (Liquid Crystal on Silicon) control chip (4) and a light path control unit (6), wherein: the collimating lens set (2) and the PBS (3) are successively arranged along a light emission direction of the light source (1); the LCOS control chip (4) is arranged at a light path of an S wave (11) reflected by a contact surface of the PBS (3); the imaging lens set (5) is arranged at an emergent light path of the S wave (11) after being modulated by the LCOS control chip (4) and transmitted through the contact surface of the PBS (3); the light path control unit (6) is arranged at a light path of a P wave (12) transmitted through the contact surface of the PBS (3); and the light path control unit (6) is vehicle lamp components, comprising a mirror (7), a light shield (8) and a magnifying glass (9).

2. The vehicle lamp system based on the PBS, as recited in claim 1, wherein: the contact surface of the PBS (3) and an incident light after being collimated by the collimating lens set (2) form an angle of 45°.

3. The vehicle lamp system based on the PBS, as recited in claim 1, wherein: when liquid crystal of the LCOS control chip (4) is bright, the LCOS control chip changes the S wave reflected by the contact surface of the PBS (3) to the P wave, so as to be transmitted through the contact surface of the PBS (3) and enter the imaging lens set (5).

4. The vehicle lamp system based on the PBS, as recited in claim 1, wherein: the collimating lens set (2) consists of a negative meniscus lens and a plane convex lens, which are arranged coaxially; the negative meniscus lens is close to the light source (1), and the plane convex lens is close to the PBS (3).

5. The vehicle lamp system based on the PBS, as recited in claim 1, wherein: the imaging lens set (5) consists of a concave lens and a plane convex lens, which are arranged coaxially; the concave lens is close to the PBS (3), and the plane convex lens is far away from the PBS (3).

* * * * *